(12) United States Patent
Gao

(10) Patent No.: US 11,364,818 B2
(45) Date of Patent: Jun. 21, 2022

(54) SEAT ADJUSTMENT METHOD, APPARATUS, AND SYSTEM

(71) Applicant: ZTE Corporation, Shenzhen (CN)

(72) Inventor: Xiang Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 268 days.

(21) Appl. No.: 16/608,176

(22) PCT Filed: Dec. 12, 2017

(86) PCT No.: PCT/CN2017/115720
§ 371 (c)(1),
(2) Date: Oct. 24, 2019

(87) PCT Pub. No.: WO2018/196395
PCT Pub. Date: Nov. 1, 2018

(65) Prior Publication Data
US 2020/0139852 A1 May 7, 2020

(30) Foreign Application Priority Data

Apr. 24, 2017 (CN) .......................... 201710272474.5

(51) Int. Cl.
*B60N 2/02* (2006.01)
*B60N 2/00* (2006.01)
*G06K 7/10* (2006.01)

(52) U.S. Cl.
CPC ........... *B60N 2/0248* (2013.01); *B60N 2/002* (2013.01); *G06K 7/10366* (2013.01); *B60N 2002/0268* (2013.01)

(58) Field of Classification Search
CPC .................. B60N 2/0248; B60N 2/002; B60N 2002/0268; G06K 7/10366
(Continued)

(56) References Cited

U.S. PATENT DOCUMENTS

| 2004/0155450 | A1* | 8/2004 | Monroe | .................. | B60R 22/20 |
| | | | | | 280/801.2 |
| 2006/0006986 | A1* | 1/2006 | Gravelle | ............ | G06K 7/10297 |
| | | | | | 340/572.1 |

(Continued)

FOREIGN PATENT DOCUMENTS

| CN | 102673517 A | 9/2012 |
| CN | 203025736 U | 6/2013 |

(Continued)

OTHER PUBLICATIONS

International Search Report for corresponding application PCT/CN2017/115720 filed Apr. 24, 2017; dated Mar. 15, 2018.

(Continued)

*Primary Examiner* — Jonathan M Dager
*Assistant Examiner* — Jean W Charleston
(74) *Attorney, Agent, or Firm* — Cantor Colburn LLP

(57) ABSTRACT

Provided are a seat adjustment method, apparatus, and system. The seat adjustment method includes: acquiring position information of a RFID tag, and acquiring seat arrangement information stored in the RFID tag; adjusting a seat corresponding to the RFID tag according to the position information of the RFID tag and the seat arrangement information stored in the RFID tag.

17 Claims, 3 Drawing Sheets

Acquire position information of a RFID tag, and acquire seat arrangement information stored in the RFID tag — S110

Adjust a seat corresponding to the RFID tag according to the position information of the RFID tag and the seat arrangement information stored in the RFID tag — S120

(58) Field of Classification Search
USPC .......................................................... 701/49
See application file for complete search history.

(56) References Cited

U.S. PATENT DOCUMENTS

| | | | | |
|---|---|---|---|---|
| 2007/0032225 | A1* | 2/2007 | Konicek | G07C 9/00182 |
| | | | | 455/417 |
| 2007/0290554 | A1* | 12/2007 | Teshima | B60N 2/0244 |
| | | | | 296/64 |
| 2013/0046457 | A1* | 2/2013 | Pettersson | B60L 1/14 |
| | | | | 701/1 |
| 2015/0197205 | A1* | 7/2015 | Xiong | B60R 16/037 |
| | | | | 701/49 |
| 2015/0239414 | A1 | 8/2015 | Thomas | |
| 2017/0200335 | A1* | 7/2017 | Da Deppo | G07C 9/28 |
| 2018/0182253 | A1* | 6/2018 | Hor-Lao | A63B 24/0062 |
| 2019/0009794 | A1* | 1/2019 | Toyoda | B60W 50/12 |
| 2019/0299817 | A1* | 10/2019 | Faltin | B60N 2/0715 |

FOREIGN PATENT DOCUMENTS

| | | |
|---|---|---|
| CN | 103287438 A | 9/2013 |
| CN | 103802689 A | 5/2014 |
| CN | 104648278 A | 5/2015 |
| CN | 105599642 A | 5/2016 |
| CN | 105667351 A | 6/2016 |
| CN | 105830470 A | 8/2016 |
| CN | 205890603 U | 1/2017 |
| FR | 2980014 A1 | 3/2013 |

OTHER PUBLICATIONS

Chinese Office Action for corresponding application 201710272474.5; Report dated Sep. 23, 2021.
Chinese Search Report for corresponding application 201710272474.5; Report dated Feb. 23, 2021.
Chinese Supplemental Search Report for corresponding application 201710272474.5; Report dated Sep. 15, 2021.

* cited by examiner

SEAT ADJUSTMENT METHOD, APPARATUS, AND SYSTEM

CROSS-REFERENCE TO RELATED APPLICATIONS

This is a National Stage Application, filed under 35 U.S.C. 371, of International Patent Application No. PCT/CN2017/115720, filed on Dec. 12, 2017, which claims priority to Chinese patent application No. 201710272474.5 filed on Apr. 24, 2017, contents of both of which are incorporated herein by reference in their entireties.

TECHNICAL FIELD

The present disclosure relates to the field of wireless communications and, in particular, to a seat adjustment method, apparatus, and system.

BACKGROUND

Different users may take a same vehicle. Since these users are different in height and body type, the position of a seat in the vehicle needs to be adjusted frequently to fit different users. Manual adjustment requires users to adjust the position of the seat by themselves and cannot quickly satisfy the requirements of the users.

At present, the Near Field Communication (NFC) technology is used to implement adjustment of the vehicle seat. An NFC reader is arranged in a lock buckle of a safety belt, and an NFC tag is arranged in lock tongue of the safety belt. An NFC module of a mobile terminal of the user sends seat information to the NFC tag every time the user takes the vehicle. When the lock tongue of the safety belt is connected to the lock buckle of the safety belt, the reader may read the seat information and automatically adjust the seat to a configured position. The seat information is adjusted according to seat position data. The seat information includes a position of a seat base and a radian of a seat back.

This leads to that the user needs take out and swipe a mobile phone to adjust the seat every time the user takes the vehicle. The seat cannot be adjusted with no person. This results in a reduction in convenience. Too much reliance on the terminal device also causes inconvenience to the user.

SUMMARY

The following is a summary of the subject described in detail herein. This summary is not intended to limit the protection scope of the claims.

The present disclosure provides a seat adjustment method, apparatus, and system, to automatically adjust a seat without extra actions of a user.

The present disclosure provides a seat adjustment method. The seat adjustment method includes following steps: position information of the RFID tag is acquired, and seat arrangement information stored in the RFID tag is acquired; a seat corresponding to the RFID tag is adjusted according to the position information of the RFID tag and the seat arrangement information stored in the RFID tag.

In an embodiment, before the position information of the RFID tag is acquired, the method further includes a following step: when a trigger condition is met, the RFID tag is searched, where if the RFID tag is found, the operation of acquiring the position information of the RFID tag is performed.

In an embodiment, before the position information of the RFID tag is acquired, the method further includes a following step: the found RFID tag is determined to be a predetermined RFID.

In an embodiment, the method further includes a following step: if the RFID tag is not found or the RFID tag is not the predetermined RFID tag, a predetermined prompt operation is performed.

In an embodiment, that the RFID tag is the predetermined RFID tag includes that an identification (ID) number of the RFID tag is the same as at least one of a plurality of prestored ID numbers.

In an embodiment, that the trigger condition is met includes that pressure, detected by a pressure sensor installed in at least one seat, reaches a predetermined pressure threshold.

In an embodiment, the step in which the position information of the RFID tag is acquired includes following steps: a position of the RFID tag is calculated according to respective distances between at last three RFID readers and the RFID tag, and respective positions of the at least three RFID readers; the calculated position of the RFID tag is matched with a seat distribution region, to determine the seat corresponding to the RFID tag.

In an embodiment, the seat adjustment method further includes following steps: if the seat arrangement information is not stored in the RFID tag, a user is prompted to adjust a state of the seat; after the seat corresponding to the RFID is adjusted, the seat arrangement information is generated according to the adjusted state of the seat, and the seat arrangement information is written into the RFID tag.

In an embodiment, the seat adjustment method further includes a following step: after a request for erasing a RFID tag is received, seat arrangement information in the RFID tag is erased.

The present disclosure provides a seat adjustment apparatus. The seat adjustment apparatus includes an acquisition module and an adjustment module.

The acquisition module is configured to acquire position information of a RFID tag, and acquire seat arrangement information stored in the RFID tag.

The adjustment module is configured to adjust a seat corresponding to the RFID tag according to the position information of the RFID tag and the seat arrangement information stored in the RFID tag.

In an embodiment, the seat adjustment apparatus further includes a detection module. The detection module is configured to, before the acquisition module acquires the position information of the RFID tag, when a trigger condition is met, search for the RFID tag, where if the RFID tag is found, the detection module instructs the acquisition module to acquire the position information of the RFID tag.

In an embodiment, the acquisition module is configured to acquire the position information of the RFID tag through a following manner: a position of the RFID tag is calculated according to respective distances between at last three RFID readers and the RFID tag, and respective positions of the at least three RFID readers; the calculated position of the RFID tag is matched with a seat distribution region, to determine the seat corresponding to the RFID tag.

In an embodiment, the seat adjustment apparatus further includes an arrangement module. The arrangement module is configured to, if the seat arrangement information is not stored in the RFID tag, prompt a user to adjust a state of the seat, and, after the seat corresponding to the RFID is adjusted, generate the seat arrangement information according to the adjusted state of the seat, and write the seat arrangement information into the RFID tag.

The present disclosure provides a seat adjustment apparatus. The seat adjustment apparatus includes a memory and a processor.

The memory is configured to store executable instructions, and the processor is configured to execute the executable instructions to perform following operations.

Position information of a RFID tag is acquired, and seat arrangement information stored in the RFID tag is acquired.

A seat corresponding to the RFID tag is adjusted according to the position information of the RFID tag and the seat arrangement information stored in the RFID tag.

In an embodiment, the processor, when executing the executable instructions, is further configured to perform a following operation: before the position information of the RFID tag is acquired, when a trigger condition is met, the RFID tag is searched, where if the RFID tag is found, the operation of acquiring the position information of the RFID tag is performed.

In an embodiment, the operation of acquiring the position information of the RFID tag includes the followings: a position of the RFID tag is calculated according to respective distances between at last three RFID readers and the RFID tag, and respective positions of the at least three RFID readers; the calculated position of the RFID tag is matched with a seat distribution region, to determine the seat corresponding to the RFID tag.

In an embodiment, the processor, when executing the executable instructions, is further configured to perform following operations: if the seat arrangement information is not stored in the RFID tag, a user is prompted to adjust a state of the seat; after the seat corresponding to the RFID is adjusted, the seat arrangement information is generated according to the adjusted state of the seat, and the seat arrangement information is written into the RFID tag.

The present disclosure provides a seat adjustment system. The seat adjustment system includes a control apparatus and a RFID tag.

The control apparatus is configured to acquire position information of the RFID tag, acquire seat arrangement information stored in the RFID tag, and adjust a seat corresponding to the RFID tag according to the position information of the RFID tag and the seat arrangement information stored in the RFID tag.

In an embodiment, the seat adjustment system further includes a detection unit. The control apparatus is further configured to, before acquiring the position information of the RFID tag, when a detection result from the detection unit meets a trigger condition, search for the RFID tag, where if the RFID tag is found, perform the operation of acquiring the position information of the RFID tag.

In an embodiment, the seat adjustment system further includes at least three RFID readers. The control apparatus may be configured to acquire the position information of the RFID tag through a following manner: a position of the RFID tag is calculated according to respective distances between the at last three RFID readers and the RFID tag, and respective positions of the at least three RFID readers; the calculated position of the RFID tag is matched with a seat distribution region, to determine the seat corresponding to the RFID tag.

In an embodiment, the seat adjustment system further includes an interaction apparatus. The control apparatus may further be configured to, if the seat arrangement information is not stored in the RFID tag, prompt a user to adjust a state of the seat through the interactive apparatus, and, after the seat corresponding to the RFID tag is adjusted, generate the seat arrangement information according to the adjusted state of the seat, and write the seat arrangement information into the RFID tag.

The present disclosure further provides a storage medium. Computer executable instructions are stored in the storage medium. The computer executable instructions are configured to execute the above method.

According to the present disclosure, no matter which seat the user sits on, the seat can be automatically adjusted according to the requirement of the user without extra actions. Thus the convenience is increase.

Other features and advantages of the present disclosure will be described in subsequent specification and, in part, become apparent from the specification or be understood through implementation of the present disclosure. The purpose and other advantages of the present disclosure may be implemented and acquired by the structure specified in the specification, the claims and the drawings.

Other aspects will become apparent upon reading and understanding the drawings and detailed description.

BRIEF DESCRIPTION OF DRAWINGS

The drawings are used for providing further understanding of the present disclosure and forming part of the specification to explain the present disclosure together with embodiments, but not to limit the present disclosure.

DETAILED DESCRIPTION

The present disclosure will be described in detail hereinafter in conjunction with the drawings. It should be noted that the embodiments and their features may be combined with each other in suitable manners.

The steps shown in the flowcharts of the drawings may be executed in a computer system storing a group of computer executable instructions. In addition, although a logical order is shown in the flowchart, in some cases, the steps shown or described may be executed in an order different from the order shown or described herein.

Embodiment 1

Figure 1:
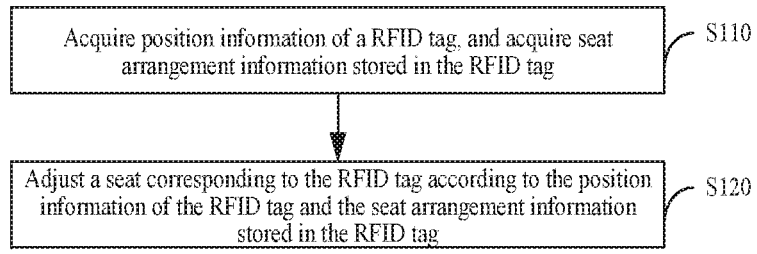
FIG. 1 is a flowchart of a seat adjustment method of an embodiment 1.

As shown in FIG. 1, a seat adjustment method includes steps S110 and S120 described below.

In S110, position information of a RFID tag is acquired, and seat arrangement information stored in the RFID tag is acquired.

In S120, a seat corresponding to the RFID tag is adjusted according to the position information of the RFID tag and the seat arrangement information stored in the RFID tag.

The embodiment may be used for, but is not limited to, automatically adjusting the seats in a vehicle.

The above steps S110 and S120 may be executed by a vehicle-mounted Telematics Box (TBOX) or other similar devices. The device for executing the steps S110 and S120 needs to have a function of reading the RFID tag, or may interact with at least one external RFID reader. In addition, the device for executing the steps S110 and S120 may adjust at least one seat.

The device for executing the steps S110 and S120 may have a function of interacting with the user, or may be connected to other devices for interacting with the user. The interaction may be conducted through a visual interface, a voice, an application (APP) on the mobile phone of the user, etc.

The order of acquiring the position information and the seat arrangement information is not limited. The position information and the seat arrangement information may be acquired in parallel. The seat arrangement information may include, but is not limited to, a radian of a seat back, an angle of inclination of the seat, an anteroposterior position of the seat. The position information may indicate the seat corresponding to the RFID tag. The seat corresponding to the RFID tag may be determined based on the position of the RFID tag and the position distribution of seats.

Each user may carries a RFID tag. For example, the user may attach the RFID tag to a carry-on item such as a mobile phone or a wallet, or may place the RFID tag in a pocket or hung it on a key fob. The manner in which the user carries the RFID tag is not limited to the above examples, and any manner for carrying the RFID tag is allowed.

When there are multiple RFID tags (e.g., there are multiple users), the position information and the stored seat arrangement information of the same RFID tag may be bound together or both carry an ID number of the RFID tag. Therefore, different RFID tags may be conveniently distinguished to conduct the seat adjustment. For example, if there are a RFID tag A and a RFID tag B, in the step S120, a seat a corresponding to the RFID tag A is determined according to the position information of the RFID tag A, and then the seat a is adjusted according to the seat arrangement information stored in the RFID tag A; a seat b corresponding to the RFID tag B is determined according to the position information of the RFID tag B, and then the seat b is adjusted according to the seat arrangement information stored in the RFID tag B.

The ID number of the RFID tag may be originally carried in the RFID tag. Different RFID tags have different ID numbers.

In an embodiment, before the position information of the RFID tag is acquired, the method may further includes a following step: when a trigger condition is met, the RFID tag is searched. If the RFID tag is found, the operation of acquiring the position information of the RFID tag is performed.

In an embodiment, whether the trigger condition is met may be detected by a seat pressure sensor installed in each seat, respectively. For example, when the pressure, detected by the seat pressure sensor installed in at least one seat, reaches a predetermined pressure threshold, it is determined that the trigger condition is met.

In a scenario where the above method is used for adjusting the seats in the vehicle, the detection may be implemented by the seat pressure sensor together with a door detector. In a case where the door detector detects that a door is opened, the seat pressure sensor installed in at least one seat detects that the pressure reaches the predetermined pressure threshold, and the door detector detects that the door is closed, it is determined that the trigger condition is met. In an embodiment, whether the trigger condition is met may also be determined by detecting whether a passenger sits in the vehicle through a camera, an infrared sensing device or the like, whether the vehicle is ignited and the like.

In an embodiment, an RFID reader may be started after the trigger condition is met.

In an embodiment, the external RFID reader may be used for searching for the RFID tag, or the device for executing the steps S110 and S120 may search for the RFID tag by itself.

In an embodiment, before the position information of the RFID tag is acquired, the method may further includes a step described below.

The found RFID tag is determined to be a predetermined RFID.

In an embodiment, if the RFID tag is not found or the RFID tag is not the predetermined RFID tag, a predetermined prompt operation may be performed. For example, the predetermined prompt operation is, but is not limited to, to send a text message to a predetermined number for prompting.

In an embodiment, that the RFID tag is found may include that a feedback signal of at least one RFID tag is received within a predetermined duration. That the RFID tag is not found may include that the feedback signal of any RFID tag is not received during the predetermined duration.

In an embodiment, that the RFID tag is the predetermined RFID tag may include that, but is not limited to, the ID number of the RFID tag is the same as at least one of prestored ID numbers.

For example, in a scenario where the above method is used for adjusting the seats in vehicles, a respective batch of RFID tags may serve as the predetermined RFID tags for each vehicle, and the user holding any tag of the batch of RFID tags may be considered as a legitimate passenger of the vehicle. The ID numbers of the batch of RFID tags are stored in the TBOX of the vehicle. After the RFID tag is found, the ID number of the RFID tag is acquired and matched with the ID numbers stored in the TBOX. If the ID number of the RFID tag is successfully matched (namely, the ID number of the RFID tag is the same as at least one of the stored ID numbers), the RFID tag is considered to be the predetermined RFID tag, namely, the RFID belongs to the vehicle.

In an embodiment, the step in which the position information of the RFID tag is acquired may include steps described below.

A position of the RFID tag is calculated according to respective distances between at last three RFID readers and the RFID tag, and respective positions of the at least three RFID readers.

The calculated position of the RFID tag is matched with a seat distribution region, to determine the seat corresponding to the RFID tag.

In an embodiment, at least three RFID readers may be fixed in the region of the seat to be adjusted in advance, and coordinates of the at least three RFID readers are stored.

In an embodiment, if there is no passenger on the seat corresponding to the RFID tag (e.g., the pressure detected by the seat pressure sensor is less than the predetermined pressure threshold), it may be a case where the user has left the RFID tag on an empty seat. In this case, the RFID tag may be ignored, and the step S120 is not executed.

In an embodiment, the method may further include steps described below.

If the seat arrangement information is not stored in the RFID tag, the user is prompted to adjust a state of the seat.

After the seat corresponding to the RFID tag is adjusted, the seat arrangement information is generated according to the adjusted state of the seat, and the seat arrangement information is written into the RFID tag.

In an embodiment, if the seat arrangement information is stored in the RFID tag, the step S120 is performed.

In an embodiment, it may be determined that the user on which seat needs to adjust the state of the seat according to the position information of the RFID tag.

In an embodiment, the user may be prompted through the voice, the visual interface, sending a message to the APP on the mobile phone of the user, etc. The user may be prompted by the device executing the steps S110 and S120, or by other devices.

In an embodiment, after the user adjusts the seat to a proper state or the user considers that the seat is in the proper state at the moment, it may be indicated that the adjustment of the state of the seat has completed in a certain manner. For example, if the user has no action within a predetermined duration (which may be, but is not limited to, 10 seconds), the adjustment is considered to be completed.

In an embodiment, the method may further include a following step: after a request for erasing a RFID tag is received, seat arrangement information in the RFID tag is erased.

In an embodiment, the user may request to erase the RFID tag by the voice, the visual interface, sending an instruction through the APP on the mobile phone, etc. The device executing the steps S110 and S120 may receive the request of the user or receive the request of the user forwarded by other devices. The form of the user requesting may include a request message, an instruction, etc.

In an embodiment, if the device executing the steps S110 and S120 has a function of writing the RFID tag, the seat arrangement information in the RFID tag may be directly erased. In another embodiment, the seat arrangement information in the RFID tag may be erased by the RFID reader.

In an embodiment, the user may specify the RFID tag to be erased by entering the ID number of the RFID tag, or selecting the RFID tag in a list.

In an embodiment, after the seat arrangement information of the RFID tag is erased, new seat arrangement information may be written through the above manner (in a case where the seat arrangement information is not stored in the RFID tag) in subsequent use. In another embodiment, after the seat arrangement information of the RFID tag is erased, new seat arrangement information may be written immediately according to the current state of the seat corresponding to the RFID tag.

In another example, a request for updating the seat arrangement information stored in the RFID tag may also be received. After the request is received, the original seat arrangement information may be directly replaced by new seat arrangement information, or the original seat arrangement information may be erased first and then the new seat arrangement information is written.

Four implementation examples will be described hereinafter for describing the embodiment.

Implementation Example 1

The implementation example provides a seat adjustment system, which is applied to adjustment of the vehicle seat. The seat adjustment system includes a vehicle-mounted TBOX, a Head Unit (HU) device, a seat pressure sensor, a vehicle door sensor, an RFID reader and a passive RFID tag.

The vehicle-mounted TBOX is responsible for running and controlling the entire system, implementing user identification, and automatically adjusting a position of a seat base and a radian of a seat back corresponding to user information.

The HU device is a user-oriented visualization module. The implementation example mainly utilizes a voice system and an RFID tag management APP (which is configured to clear the seat arrangement information in the RFID tag) of the HU device to interact with the user.

The seat pressure sensor is arranged in each seat and configured to notify the vehicle-mounted TBOX whether a passenger is on the seat where the seat pressure sensor is disposed.

The vehicle door sensor may be configured to determine opening and closing of the door and to notify the vehicle-mounted TBOX.

The RFID reader is configured to position the RFID tag and write or erase data to the RFID tag.

The passive RFID tag has a storage space for recording an ID number of the RFID tag and the seat arrangement information of the passive RFID tag, and implementing an in-vehicle positioning function in cooperation with the RFID reader.

The implementation example further provides a seat adjustment method based on the above system. The user needs to carry the passive RFID tag, which may be provided to the user when the user purchases the vehicle. For example, the passive RFID tag may be affixed to the mobile phone or other portable items of the user. The seat adjustment method includes steps described below.

In a step 1, when the vehicle-mounted TBOX detects that the door is opened, it is determined which seats are occupied by passengers according to the pressure reported by at least one seat pressure sensor; when determining that a driver seat is occupied by a passenger and all vehicle doors are closed, it is considered that the vehicle is in a driving ready state, and the seat adjustment function is started.

In a step 2, the RFID reader is started to search for a feedback signal of the RFID tag by transmitting a radio frequency signal; then a step 3 is performed if the feedback signal of the RFID tag is detected within a predetermined duration. The RFID tag to which the feedback signal detected in this step belongs is called as an in-vehicle RFID tag hereinafter. If the feedback signal is not detected during the predetermined duration, the RFID reader reports to the vehicle-mounted TBOX. The vehicle-mounted TBOX turns off the RFID reader and sends a text message to the mobile phone of the vehicle owner (which may be configured in the TBOX in advance) through an embedded SIM card, to prompt the vehicle owner to detect whether the vehicle is intruded by a stranger.

In a step 3, if the ID number of the in-vehicle RFID tag is analyzed and determined to belong to the vehicle, positioning analysis is started. The position information of each in-vehicle RFID tag is respectively determined through a related algorithm. The position information is used for indicating the seat (including a front-row driver seat, a front-row passenger seat, and rear-row left, middle and right seats) where the RFID tag is positioned. If the seat arrangement information is not stored in the in-vehicle RFID tag, a step 4 is executed; if seat arrangement information is stored in the in-vehicle RFID tag, the vehicle-mounted TBOX acquires the position information of the in-vehicle RFID tag and the seat arrangement information stored in the in-vehicle RFID tag through the RFID tag, and the vehicle-mounted TBOX correspondingly adjusts the seat according to the position information and the seat arrangement information of the in-vehicle RFID tag.

In the step 4, if a certain in-vehicle RFID tag does not contain the seat arrangement information, the vehicle-mounted TBOX prompts, through a voice function of the in-vehicle HU device, the user on the seat where the in-vehicle RFID tag is positioned to manually arrange the seat to a proper state in a case where the user uses the seat for the first time. The arrangement includes to adjust the radian of the seat back, the anteroposterior position of the seat, etc. If no operation is performed in a predetermined duration (the predetermined duration may be configured in advance, for example, the predetermined duration may be 10 seconds) after the operation of adjustment is completed, the seat information is written and stored into the RFID tag positioned in the corresponding seat through the RFID reader. The user is prompted that the arrangement is completed through a voice.

If the user wants to change the content of a certain RFID tag, the content stored in the RFID tag may be cleared through the RFID tag management APP on an interface of the HU device. The HU device may send an instruction to the vehicle-mounted TBOX through a USB cable, and the vehicle-mounted TBOX erases seat arrangement information in the corresponding RFID tag through the RFID reader. New seat arrangement information may be written through the step 4 in subsequent use, or the new seat arrangement information may be written immediately according to the state of the seat after the seat arrangement information is erased. In another embodiment, the user may also update the seat arrangement information stored in the corresponding RFID tag according to the current state of the seat through an indication of the RFID tag management APP on the interface of the HU device. New seat arrangement information may be used for replacing the original seat arrangement information, or the original seat arrangement information may be erased first and then the new seat arrangement information may be written.

Implementation Example 2

Figure 2:
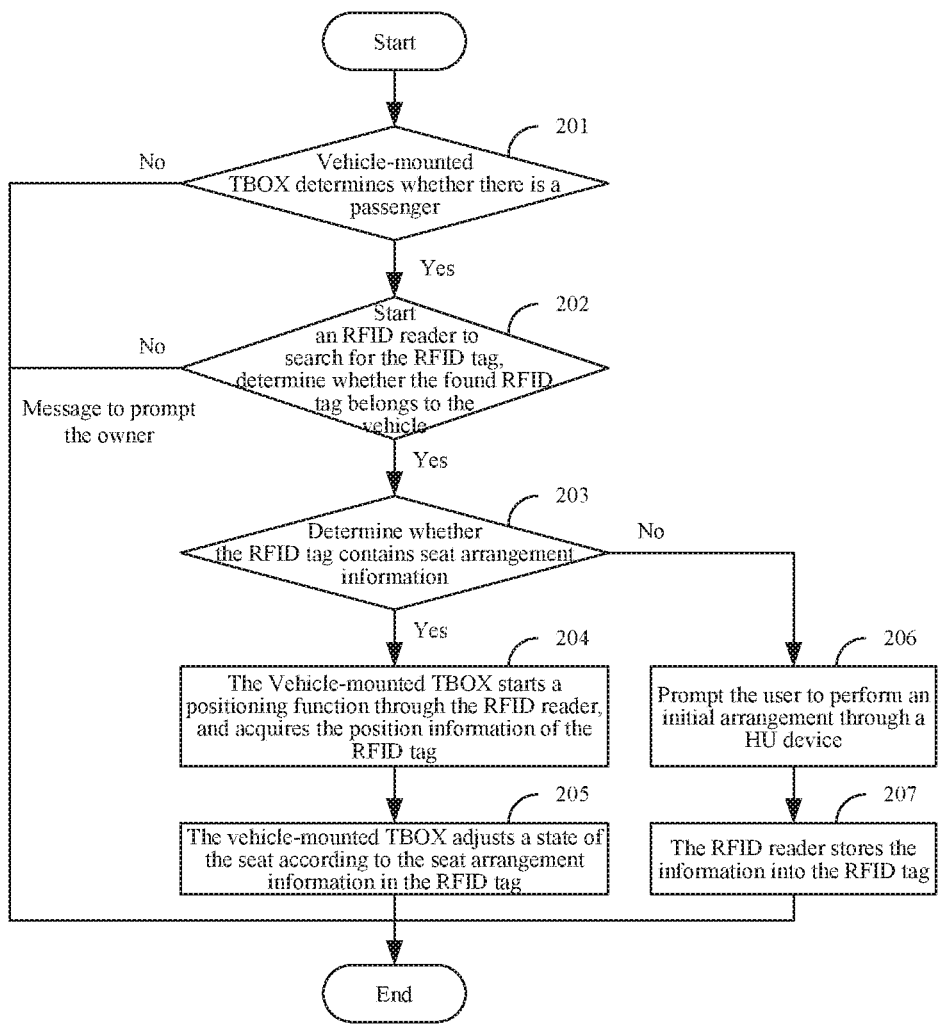
FIG. 2 is a flowchart of an implementation example 1.

The implementation example provides a seat adjustment method using RFID positioning technology. The process performed by the vehicle-mounted TBOX during the seat adjustment is shown in FIG. 2. The process includes steps described below.

In a step 201, the vehicle-mounted TBOX determines whether there is a passenger (including a driver here) according to the vehicle door sensor and the seat pressure sensor. If there is a passenger, a step 202 is performed; if there is no passenger, the process ends.

For example, the vehicle door sensor may detect opening and closing of the vehicle door, and the seat pressure sensor under each seat respectively determines whether the seat is occupied by a passenger according to whether the pressure meets a certain threshold range (which may be configured in advance). The vehicle-mounted TBOX receives the conditions reported by the vehicle door sensor and the seat pressure sensor, and determines that there is a passenger in the vehicle in a case where at least one seat is occupied by the passenger after the vehicle door is opened and then closed.

In the step 202, the vehicle-mounted TBOX starts the RFID reader to search for the RFID tag. If a RFID tag belonging to the vehicle is found, a step 203 is performed; if no RFID tag is found or the found RFID tag does not belong to the vehicle, the process ends. In addition, before the process ends, a text message may be prompted to the user to confirm whether a stranger enters the vehicle.

In this step, whether the RFID tag is found may be determined by whether the feedback signal of the RFID tag is received within a predetermined duration.

For example, the RFID reader transmits the radio frequency signal. The passive RFID tag in an effective range of the radio frequency signal extracts required operating power supply from the radio frequency energy transmitted by the RFID reader, and transmits the feedback signal to the RFID reader in a reflection modulation mode. If the RFID reader does not acquire the feedback signal of the RFID tag during the predetermined duration, it is considered that the passenger in the vehicle does not carry the tag, and the passenger may not be the vehicle owner or not be authorized. This is fed back to the vehicle-mounted TBOX, and the vehicle-mounted TBOX prompts the vehicle owner (which may be configured in advance) that the vehicle may be illegally intruded through sending a text message; if the RFID reader acquires the feedback signal of the RFID tag within the predetermined duration, whether the RFID tag belongs to the vehicle (which may be configured in advance) is determined. If yes, the step 203 is performed; if not, it is considered that the passenger in the vehicle may not be the vehicle owner or not be authorized. The text message may be sent to prompt the vehicle owner.

In the step 203, it is determined whether the seat arrangement information (including the radian of the seat back and the adjustment of the anteroposterior position of the seat) is stored in the found RFID tag. If yes, a step 204 is performed; if not, a step 206 is performed.

In the step 204, the vehicle-mounted TBOX starts the positioning function through the RFID reader, and respectively acquires the position information of each found RFID tag, namely the position of the seat (including the front-row driver seat, the front-row passenger seat, and the rear-row left, middle and right seats) where the RFID tag is positioned. A step 205 is performed.

In this step, if the position of a certain RFID tag is not in any predetermined seat region, the RFID tag may be ignored. For example, if the RFID tag is in the trunk, the RFID tag may be ignored. In addition, if the positioned seat is not occupied by a passenger, the RFID tag may be ignored. For example, if the seat pressure sensor determines that only the driver seat is occupied by a passenger, and the RFID tag is positioned in a certain seat on the rear row, the RFID tag may be ignored.

In the step 205, the vehicle-mounted TBOX respectively adjusts the state of the seat corresponding to the position information of the RFID tag according to the seat arrangement information in the RFID tag.

In this step, the RFID reader analyzes the seat arrangement information in the RFID tag, and sends the position information and the seat arrangement information to the TBOX. The TBOX arranges the corresponding seat to a state predetermined by the user according to the seat arrangement information and the position information, to complete the entire process.

In a step 206, the vehicle-mounted TBOX prompts the user to perform an initial arrangement in voice through the HU device. A step 207 is performed.

In the step 207, if the user does not conduct any operation within a predetermined duration (for example, 10 seconds) after manually adjusting the seat, the vehicle-mounted TBOX instructs the RFID reader to store the seat arrangement information into the corresponding RFID tag. The seat arrangement information may be generated according to a state to which the user adjusts the seat.

The above steps 202 to 204 may also be implemented in another order. For example, after receiving the feedback signal, the RFID reader first positions the seat in which the RFID tag is located (including the front-row driving seat, the copilot seat, and the rear-row left, middle and right seats), and then extracts and analyses the stored information in the RFID tag, including determining whether the RFID tag is matched (i.e., whether the RFID tag belongs to the vehicle), and whether the RFID tag contains the seat arrangement information (including the radian of the seat back, the adjustment of the anteroposterior position of the seat). If yes, the step 205 is executed; if not, the step 206 is executed. If the feedback signal is not received or the RFID tag is not successfully matched, a text message may be sent to prompt the vehicle owner.

In the above step 203, if the analyzed RFID tag does not have the seat arrangement information, that is, the RFID tag may be used for the first time or the seat arrangement information in the RFID tag was erased, the RFID reader notifies the vehicle-mounted TBOX of the situation that the RFID tag does not have the seat arrangement information. The vehicle-mounted TBOX immediately prompts, through the voice system of the HU device, the user to perform an initial manual arrangement (that is, the step 206 is performed). In the step 207, the user does not conduct any operation for 10 seconds (which may be preconfigured in advance) after the user completes the seat adjustment, the vehicle-mounted TBOX considers that the user completes the arrangement, and transmits the seat arrangement information to the RFID reader. The RFID reader writes the seat arrangement information into the corresponding RFID tag for storage through the radio frequency signal.

Implementation Example 3

Figure 3:
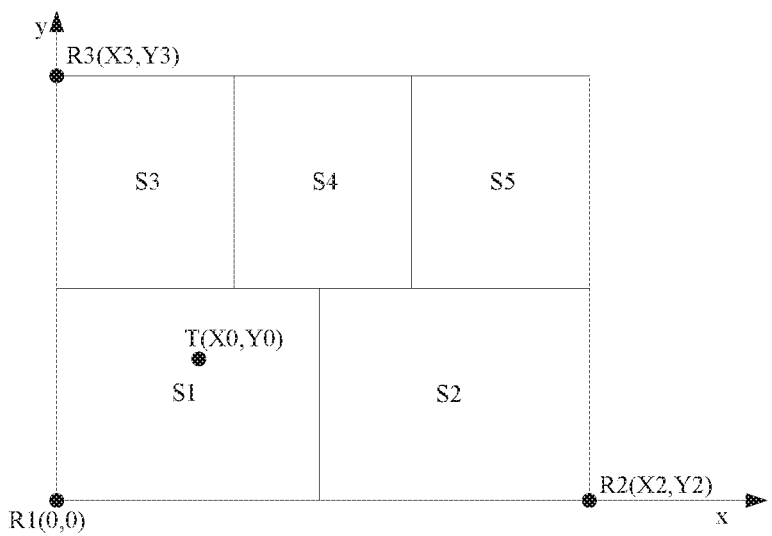
FIG. 3 is a schematic diagram illustrating a seat region and distribution of RFID readers in an implementation example 3.

The implementation example describes how the RFID reader cooperates with the RFID tag to implement the positioning. FIG. 3 is simulation diagram of a layout inside the vehicle. The horizontal axis is an X axis, and the vertical axis is a Y axis. The front row is evenly divided into two regions, which respectively represent a passenger seat S1 and a driver seat S2. The rear row is divided into three regions, which respectively represent a rear-row behind-front-row-passenger seat S3, a rear-row middle seat S4, and a rear-row behind-driver seat S5. It is assumed that a certain RFID tag T is positioned at the front-row passenger seat, and at a position with coordinates of (X0, Y0). Three RFID readers are required for positioning. These RFID readers are disposed at positions of R1(0,0), R2(X2,Y2) and R3(X3,Y3) respectively, and are placed at the same height as a plane of the seats. The positions of these three RFID readers may be stored in the vehicle-mounted TBOX.

The RFID reader R1 transmits the radio frequency signal to the RFID tag T at time T1, and receives the feedback signal returned from the RFID tag T at time T2. The distance R1 from the reader R1 to the tag T may be calculated according to the electromagnetic wave spatial propagation speed c ($3\times10^8$ m/s) and the formula $R1=c\times[(T2-T1)/2]$. The distance R2 from the reader R2 to the tag T, and the distance R3 from the reader R3 to the tag T may be calculated respectively in the same manner.

Figure 4:
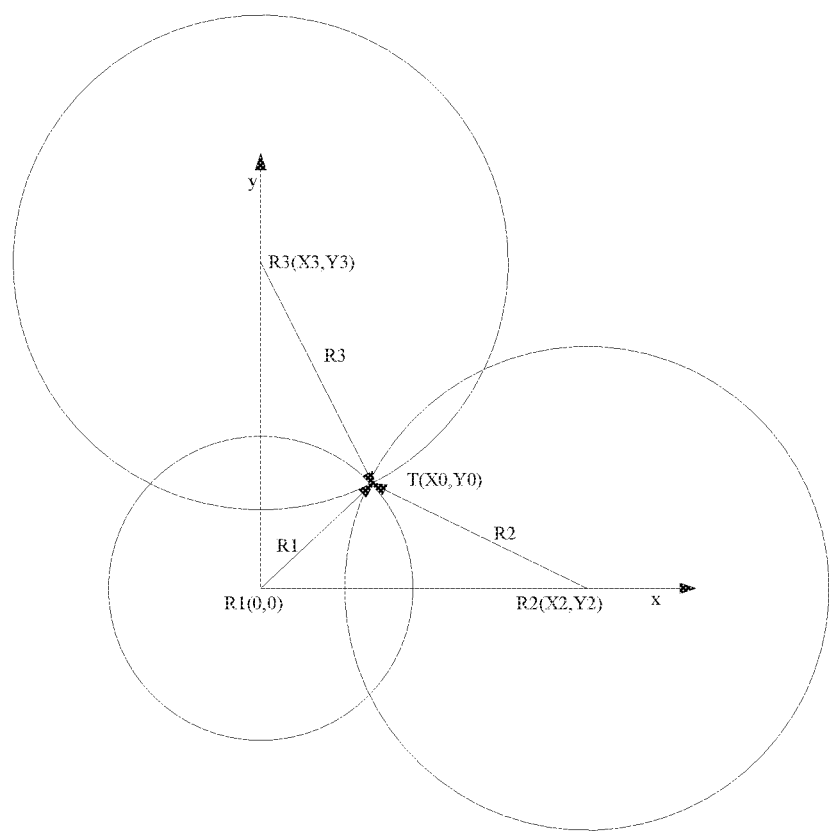
FIG. 4 is a schematic diagram of a principle of positioning a RFID tag.

According to the geometrical principle, the RFID tag must be positioned on a circle with Ri (i=1, 2, 3) as a radius and the position of the RFID reader as a center. That is, the position (X0, Y0) of the RFID tag and the position (Xi, Yi) of the RFID reader meet a following relation: $(Xi-X0)^2 + (Yi-Y0)^2 = Ri^2$. The coordinates (X0,Y0) of the tag may be obtained by the simultaneous equations. The principle may be seen in FIG. 4.

The calculated position of the RFID tag is compared with the seat region position distribution (which is calculated in the factory) shown in FIG. 3, and it is confirmed that the tag T is within the region of the front-row passenger seat S1. Here, the positioning is completed.

Implementation Example 4

Figure 5:
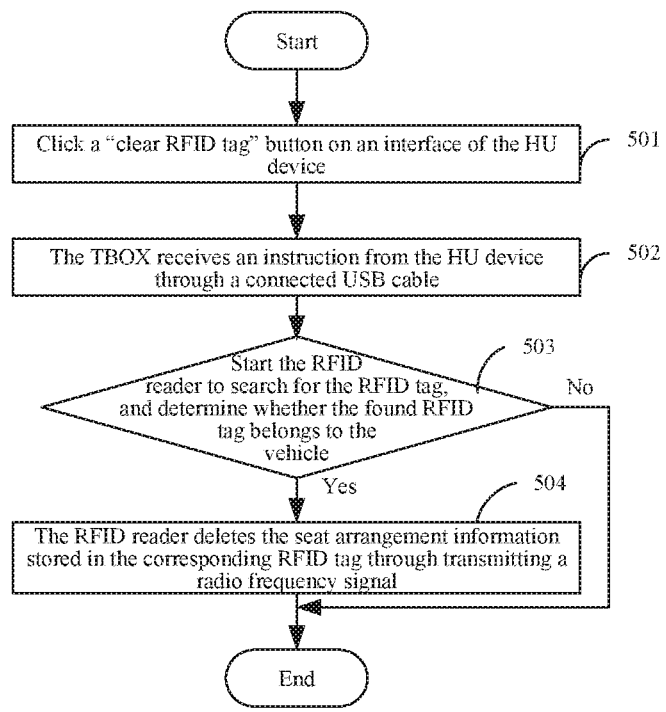
FIG. 5 is a flowchart of an implementation example 4.

The implementation example provides a method for clearing the seat arrangement information stored in the RFID tag. It is assumed that the vehicle-mounted HU device is connected to the vehicle-mounted TBOX through a USB port. A display interface of the HU device includes an RFID tag information clearing APP. The cleaning process is shown in FIG. 5 and includes steps described below.

In a step 501, the user selects an RFID tag in the APP (for example, the user may enter an ID number of the RFID tag or select an RFID tag in a list) and clicks a clear RFID tag button. The HU device generates a corresponding instruction and sends the instruction to the vehicle-mounted TBOX.

In a step 502, the vehicle-mounted TBOX receives the instruction from the HU device through the connected USB cable.

In a step 503, the vehicle-mounted TBOX starts the RFID reader to search for the corresponding RFID tag. If the RFID tag is found, a step 504 is performed; if the RFID tag is not found, the process ends, and prompt information of failure clear may be fed back to the user through the HU device.

In the step 504, the seat arrangement information stored in the corresponding RFID tag is erased by the RFID reader, and new seat arrangement information may be written into the RFID tag in the next time of use.

Embodiment 2

Figure 6:
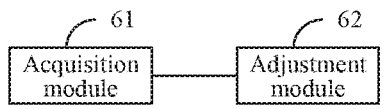
FIG. 6 is a schematic diagram of a seat adjustment apparatus of an embodiment 2.

As shown in FIG. 6, a seat adjustment apparatus includes an acquisition module 61 and an adjustment module 62.

The acquisition module 61 is configured to acquire position information of a RFID tag, and acquire seat arrangement information stored in the RFID tag.

The adjustment module 62 is configured to adjust a seat corresponding to the RFID tag according to the position information of the RFID tag and the seat arrangement information stored in the RFID tag.

In the embodiment, the seat adjustment apparatus may have a function of reading the RFID tag, or the seat position information stored in the RFID tag may be acquired through an external RFID reader.

In an embodiment, the seat adjustment apparatus may further includes a detection module. The detection module is configured to, before the acquisition module acquires the position information of the RFID tag, when a trigger condition is met, search for the RFID tag. If the RFID tag is found, the detection module instructs the acquisition module to acquire the position information of the RFID tag.

In an embodiment, the detection module may further determine that the found RFID tag is a predetermined RFID before the acquisition module acquires the position information of the RFID tag.

In an embodiment, the RFID tag may be searched through the external RFID reader, or through the seat adjustment apparatus.

In an embodiment, if the RFID tag is not found or the RFID tag is not the predetermined RFID tag, a predetermined prompt operation may be performed.

In an embodiment, that the RFID tag is the predetermined RFID tag may include that an ID number of the RFID tag is the same as at least one of a plurality of prestored ID numbers.

In an embodiment, that the trigger condition is met may include that pressure, detected by a seat pressure sensor installed in at least one seat, reaches a predetermined pressure threshold.

In an embodiment, the acquisition module may acquire the position information of the RFID tag through a following manner: a position of the RFID tag is calculated according to respective distances between at last three RFID readers and the RFID tag, and respective positions of the at least three RFID readers; the calculated position of the RFID tag is matched with a seat distribution region, to determine the seat corresponding to the RFID tag.

In an embodiment, the three RFID readers may be external devices to the seat adjustment apparatus, or may be considered as components of the seat adjustment apparatus.

In an embodiment, the seat adjustment apparatus may further include an arrangement module. The arrangement module is configured to, if the seat arrangement information is not stored in the RFID tag, prompt a user to adjust a state of the seat; and, after the seat corresponding to the RFID is adjusted, generate the seat arrangement information according to the adjusted state of the seat, and write the seat arrangement information into the RFID tag.

In an embodiment, the seat adjustment apparatus may further include an erasing module. The erasing module is configured to, after receiving a request for erasing a RFID tag, erase seat arrangement information in the RFID tag.

Other implementation details may be referred to the embodiment 1.

Embodiment 3

A seat adjustment apparatus includes a memory and a processor.

The memory is configured to store executable instructions. The processor is configured to execute the executable instructions to perform following operations.

Position information of a RFID tag is acquired, and seat arrangement information stored in the RFID tag is acquired.

A seat corresponding to the RFID tag is adjusted according to the position information of the RFID tag and the seat arrangement information stored in the RFID tag.

In the embodiment, the seat adjustment apparatus may have a function of reading the RFID tag, or the seat position information stored in the RFID tag may be acquired through an external RFID reader.

In an embodiment, the processor, when executing the executable instructions, may further perform a following operation: before the position information of the RFID tag is acquired, when a trigger condition is met, the RFID tag is searched. If the RFID tag is found, the operation of acquiring the position information of the RFID tag is performed.

In an embodiment, the RFID tag may be searched through the external RFID reader, or through the seat adjustment apparatus.

In an embodiment, the processor, when executing the executable instructions, may further perform a following operation: before the location information of the RFID tag is acquired, the found RFID tag is determined to be a predetermined RFID.

In an embodiment, the processor, when executing the executable instructions, may further perform a following operation: if the RFID tag is not found or the RFID tag is not the predetermined RFID tag, a predetermined prompt operation is performed.

In an embodiment, that the RFID tag is the predetermined RFID tag may include that an ID number of the RFID tag is the same as at least one of a plurality of prestored ID numbers.

In an embodiment, that the trigger condition is met may include that pressure, detected by a seat pressure sensor installed in at least one seat, reaches a predetermined pressure threshold.

In an embodiment, the step in which the position information of the RFID tag is acquired through the RFID reader may include steps described below.

A position of the RFID tag is calculated according to respective distances between at last three RFID readers and the RFID tag, and respective positions of the at least three RFID readers.

The calculated position of the RFID tag is matched with a seat distribution region, to determine the seat corresponding to the RFID tag.

In an embodiment, the three RFID readers may be external devices to the seat adjustment apparatus, or may be considered as components of the seat adjustment apparatus.

In an embodiment, the processor, when executing the executable instructions, may further perform following operations: if the seat arrangement information is not stored in the RFID tag, a user is prompted to adjust a state of the seat; after the seat corresponding to the RFID is adjusted, the seat arrangement information is generated according to the adjusted state of the seat, and the seat arrangement information is written into the RFID tag.

In an embodiment, the processor, when executing the executable instructions, may further perform a following operation: after a request for erasing a RFID tag is received, seat arrangement information in the RFID tag is erased.

Other implementation details may be referred to the embodiment 1.

Embodiment 4

A seat adjustment system includes a control apparatus and a RFID tag.

The control apparatus is configured to acquire position information of the RFID tag, acquire seat arrangement information stored in the RFID tag, and adjust a seat corresponding to the RFID tag according to the position information of the RFID tag and the seat arrangement information stored in the RFID tag.

In the embodiment, the control apparatus may have a function of reading the RFID tag, or the seat position information stored in the RFID tag is acquired through an external RFID reader.

The control apparatus may be, but is not limited to, a vehicle-mounted TBOX.

In an embodiment, the seat adjustment system may further include a detection unit. The control apparatus may further configured to, before acquiring the position information of the RFID tag, when a detection result from the detection unit meets a trigger condition, search for the RFID tag. If the RFID tag is found, the operation of acquiring the position information of the RFID tag is performed.

In an embodiment, the control apparatus may search for the RFID tag through the external RFID reader, or by the control apparatus itself.

In an embodiment, the detection unit may be, but is not limited to, a seat pressure sensor. The seat pressure sensor may be installed in each seat. That the trigger condition is met may include that, but is not limited to, the pressure, detected by the seat pressure sensor installed in at least one seat, reaches a predetermined pressure threshold.

In an embodiment, the control apparatus may be further configured to, if the RFID tag is not found or the RFID tag is not the predetermined RFID tag, perform a predetermined prompt operation.

In an embodiment, that the RFID tag is the predetermined RFID tag may include that an ID number of the RFID tag is the same as at least one of a plurality of prestored ID numbers.

In a scenario where the above system is used for adjusting the seats in the vehicle, the system may further include a vehicle door detector. After the vehicle door detector detects that the vehicle door is opened, if the pressure, detected by the seat pressure sensor installed in at least one seat, exceeds the predetermined pressure threshold, and the vehicle door is detected to be closed, it is determined that the trigger condition is met.

In an embodiment, the system further includes at least three RFID readers.

The control apparatus may acquire the position information of the RFID tag through a following manner: a position of the RFID tag is calculated according to respective distances between the at last three RFID readers and the RFID tag, and respective positions of the at least three RFID readers; the calculated position of the RFID tag is matched with a seat distribution region, to determine the seat corresponding to the RFID tag.

In an embodiment, the seat adjustment system may further include an interaction apparatus. The control apparatus is further configured to, if the seat arrangement information is not stored in the RFID tag, prompt a user to adjust a state of the seat through the interaction apparatus; and, after the seat corresponding to the RFID is adjusted, generate the seat arrangement information according to the adjusted state of the seat, and write the seat arrangement information into the RFID tag.

The interaction apparatus may be, but is not limited to, a HU device.

In an embodiment, the control apparatus may have a function of interacting with the user.

In an embodiment, the control apparatus may be further configured to, after receiving a request for erasing a RFID tag, erase seat arrangement information in the RFID tag.

Other implementation details may be referred to the embodiment 1.

Obviously, those skilled in the art should understand that the modules or steps of the above embodiments may be implemented by a common computing device. The modules or steps may be concentrated on a single computing device or distributed on a network composed of multiple computing devices. In an embodiment, the modules or steps may be implemented by executable instructions or program codes of the computing device, so that they may be stored in a storage device and be executed by the computing device. Moreover, in some cases, the steps shown or described may be executed in a different order than here. The modules or steps may be implemented by fabricating them into respective integrated circuits, or by implementing multiple modules or steps into a single integrated circuit module.

Although the embodiments disclosed in the present disclosure are described above, the described contents are only the embodiments adopted for facilitating understanding of the present disclosure, and are not intended to limit the present disclosure. For those skilled in the art, although any changes and variations may be conducted in form and detail of implementation, the protection scope of the present disclosure is to be determined by the scope of the accompanying claims.

INDUSTRIAL APPLICABILITY

The present disclosure can implement that no matter which seat the user sits on, the seat can be automatically adjusted according to the requirement of the user without extra actions. Thus the convenience is increase.

What is claimed is:

1. A seat adjustment method, comprising:
   acquiring position information of a Radio Frequency Identification (RFID) tag, and acquiring seat arrangement information stored in the RFID tag; and
   adjusting a seat corresponding to the RFID tag in a plurality of seats according to the position information of the RFID tag and the seat arrangement information stored in the RFID tag;
   wherein acquiring the position information of the RFID tag comprises: calculating a position of the RFID tag according to respective distances between each of at least three RFID readers and the RFID tag, and respective positions of the at least three RFID readers; and
   adjusting the seat corresponding to the RFID tag in the plurality of seats according to the position information of the RFID tag and the seat arrangement information stored in the RFID tag comprises: matching the calculated position of the RFID tag with a seat distribution region, to determine the seat corresponding to the RFID tag in the plurality of seats, and adjusting the seat corresponding to the RFID tag according to the seat arrangement information stored in the RFID tag.

2. The seat adjustment method of claim 1, wherein before acquiring the position information of the RFID tag, the method further comprises:
   in a case where a trigger condition is met, searching for the RFID tag, wherein in response to determining that the RFID tag is found, the operation of acquiring the position information of the RFID tag is performed.

3. The seat adjustment method of claim 2, wherein before acquiring the position information of the RFID tag, the method further comprises:
   determining that the found RFID tag is a predetermined RFID tag.

4. The seat adjustment method of claim 3, further comprising:
   in response to determining that the RFID tag is not found or the RFID tag is not the predetermined RFID tag, performing a predetermined prompt operation.

5. The seat adjustment method of claim 2, wherein that the trigger condition is met comprises:
   pressure, detected by a pressure sensor installed in at least one seat, reaching a predetermined pressure threshold.

6. The seat adjustment method of claim 3, wherein that the RFID tag is the predetermined RFID tag comprises: an identification (ID) number of the RFID tag is the same as at least one of a plurality of prestored ID numbers.

7. The seat adjustment method of claim 1, further comprising:
   in response to determining that the seat arrangement information is not stored in the RFID tag, prompting a user to adjust a state of the seat; and after the seat corresponding to the RFID tag is adjusted, generating the seat arrangement information according to the adjusted state of the seat, and writing the seat arrangement information into the RFID tag.

8. The seat adjustment method of claim 1, further comprising:
after receiving a request for erasing a RFID tag, erasing seat arrangement information in the RFID tag.

9. A non-transitory computer readable storage medium, wherein computer executable instructions are stored in the computer readable storage medium, and the computer executable instructions are configured to execute the method of claim 1.

10. A seat adjustment apparatus, comprising:
an acquisition module, which is configured to acquire position information of a Radio Frequency Identification (RFID) tag, and acquire seat arrangement information stored in the RFID tag; and
an adjustment module, which is configured to adjust a seat corresponding to the RFID tag in a plurality of seats according to the position information of the RFID tag and the seat arrangement information stored in the RFID tag;
wherein the acquisition module is configured to acquire the position information of the RFID tag through a manner of: calculating a position of the RFID tag according to respective distances between each of at least three RFID readers and the RFID tag, and respective positions of the at least three RFID readers; and
the adjustment module is configured to adjust the seat corresponding to the RFID tag in the plurality of seats according to the position information of the RFID tag and the seat arrangement information stored in the RFID tag through a manner of: matching the calculated position of the RFID tag with a seat distribution region, to determine the seat corresponding to the RFID tag in the plurality of seats, and adjusting the seat corresponding to the RFID tag according to the seat arrangement information stored in the RFID tag.

11. The seat adjustment apparatus of claim 10, further comprising:
a detection module, which is configured to, before the acquisition module acquires the position information of the RFID tag, in a case where a trigger condition is met, search for the RFID tag, wherein in response to determining that the RFID tag is found, the detection module instructs the acquisition module to acquire the position information of the RFID tag.

12. The seat adjustment apparatus of claim 11, further comprising:
an arrangement module, which is configured to, in response to determining that the seat arrangement information is not stored in the RFID tag, prompt a user to adjust a state of the seat, and, after the seat corresponding to the RFID is adjusted, generate the seat arrangement information according to the adjusted state of the seat, and write the seat arrangement information into the RFID tag.

13. A seat adjustment apparatus, comprising a memory and a processor;
wherein the memory is configured to store executable instructions, and the processor is configured to execute the executable instructions to perform operations of:
acquiring position information of a Radio Frequency Identification (RFID) tag, and acquiring seat arrangement information stored in the RFID tag; and
adjusting a seat corresponding to the RFID tag in a plurality of seats according to the position information of the RFID tag and the seat arrangement information stored in the RFID tag;
wherein acquiring the position information of the RFID tag comprises: calculating a position of the RFID tag according to respective distances between each of at least three RFID readers and the RFID tag, and respective positions of the at least three RFID readers; and
adjusting the seat corresponding to the RFID tag in the plurality of seats according to the position information of the RFID tag and the seat arrangement information stored in the RFID tag comprises: matching the calculated position of the RFID tag with a seat distribution region, to determine the seat corresponding to the RFID tag in the plurality of seats, and adjusting the seat corresponding to the RFID tag according to the seat arrangement information stored in the RFID tag.

14. The seat adjustment apparatus of claim 13, wherein the processor, when executing the executable instructions, is further configured to perform an operation of:
before acquiring the position information of the RFID tag, in a case where a trigger condition is met, searching for the RFID tag, wherein in response to determining that the RFID tag is found, the operation of acquiring the position information of the RFID tag is performed.

15. The seat adjustment apparatus of claim 14, wherein before acquiring the position information of the RFID tag, the processor, when executing the executable instructions, is further configured to perform an operation of:
determining that the found RFID tag is a predetermined RFID tag, wherein that the RFID tag is the predetermined RFID tag comprises: an identification (ID) number of the RFID tag is the same as at least one of a plurality of prestored ID numbers.

16. The seat adjustment apparatus of claim 14, wherein that the trigger condition is met comprises:
pressure, detected by a pressure sensor installed in at least one seat, reaching a predetermined pressure threshold.

17. The seat adjustment apparatus of claim 13, wherein the processor, when executing the executable instructions, is further configured to perform operations of:
in response to determining that the seat arrangement information is not stored in the RFID tag, prompting a user to adjust a state of the seat; after the seat corresponding to the RFID is adjusted, generating the seat arrangement information according to the adjusted state of the seat, and writing the seat arrangement information into the RFID tag.

* * * * *